United States Patent [19]

Gardiner et al.

[11] Patent Number: 4,649,700
[45] Date of Patent: Mar. 17, 1987

[54] FUEL CONTROL SYSTEM

[76] Inventors: Philip Gardiner, Noel Penny Turbines Limited, Siskin Drive, Toll Bar End, Coventry CV3 4FE; Robert W. Chevis, Siskin Drive, Toll Bar End, Coventry; Robert N. Penny, 12 Alderbrook Road, Solihull, West Midlands, all of England

[21] Appl. No.: 728,037

[22] Filed: Apr. 29, 1985

[51] Int. Cl.⁴ ............................................. F02C 9/28
[52] U.S. Cl. ................................................ 60/39.281
[58] Field of Search ...................................... 60/39.281

[56] References Cited

U.S. PATENT DOCUMENTS

| | | | |
|---|---|---|---|
| 3,021,674 | 2/1962 | Zeisloft | 60/39.281 |
| 3,139,727 | 7/1964 | Tonell | 60/39.281 |
| 3,520,133 | 7/1970 | Loft et al. | 60/39.281 |
| 4,074,521 | 2/1978 | Smith | 60/39.281 |
| 4,300,348 | 11/1981 | Lewis et al. | 60/39.281 |
| 4,394,811 | 7/1983 | Swick | 60/39.281 |

Primary Examiner—Louis J. Casaregola
Attorney, Agent, or Firm—Gifford, Groh, VanOphem, Sheridan, Sprinkle and Dolgorukov

[57] ABSTRACT

A fuel control system is provided for a turbine engine for delivering fuel from a fuel source and to the turbine engine combustion chamber to maximize fuel economy engine efficiency. The fuel control system comprises a fuel pump having its outlet connected to the inlet of a fuel control assembly while the outlet from the fuel control assembly is connected to the combustion chamber. A variable orifice within the fuel control assembly is responsive both to the differential pressure between the compressor inlet and outlet as well as the position of the engine throttle to vary the flow rate through the fuel control assembly and to the combustion chamber.

7 Claims, 6 Drawing Figures

FUEL CONTROL SYSTEM

BACKGROUND OF THE INVENTION

I. Field of the Invention

The present invention relates generally to fuel control systems and, more particularly, to a fuel control system for a turbine engine.

II. Description of the Prior Art

There have been a number of previously known fuel control systems which are designed for use with turbine engines. These previously known fuel control systems utilize any of a number of different engine parameters, such as the turbine engine speed and/or the power output of the engine, to control the engine fuel consumption.

A primary disadvantage of the previously known fuel control systems, however, is that such fuel control systems are complex in construction and prone to failure. However, in many turbine engine applications, such as the use of the turbine engine as power plant for aircraft, engine reliability is of the utmost importance and the possibility of engine failure must be virtually eliminated.

SUMMARY OF THE PRESENT INVENTION

The present invention provides a fuel control assembly for a turbine engine which is simple and reliable in construction and yet effectively increases the fuel efficiency of the engine. The fuel control system furthermore compensates for operation of the engine at different altitudes and is thus particularly suited for use with an aircraft engine.

In brief, the fuel control system of the present invention comprises a fuel pump having its inlet connected to the source of fuel and its outlet connected to the inlet of the fuel control assembly. The fuel control assembly also includes an outlet which is fluidly connected with the fuel sprayers in the turbine engine combustion chamber.

The fuel control assembly comprises a variable orifice fluidly connected in series between the inlet and outlet of the fuel control assembly. A pressure regulator (spill valve) maintains a controlled pressure drop across the orifice. The size of the orifice substantially controls the flow rate through the fuel control assembly and thus the flow rate to the combustion chamber.

In the preferred form of the invention, the variable orifice comprises a pair of tubular orifice members dimensioned so that one member is telescopically received within the other. In addition, each member includes a radial orifice formed through it and these orifices overlap each other. One of the orifice members is rotatably mounted within the fuel control housing while the other orifice member is axially mounted within the fuel control housing. The rotational position of the first orifice member is controlled by the differential pressure between the intake and outlet of the turbine engine compressor while the axial position of the second orifice member is controlled by the position of the engine throttle. Movement of either orifice member varies the size of the variable orifice and thus the flow rate through the fuel control assembly.

The variable orifice is designed to produce a turbine entry temperature versus the rotational speed of the engine such that at a fixed position of the engine throttle and at a given rotational speed of the engine, the turbine entry temperature is maintained substantially constant regardless of the altitude of the engine.

BRIEF DESCRIPTION OF THE DRAWING

A better understanding of the present invention will be had upon reference to the following detailed description when read in conjunction with the accompanying drawing, wherein like reference characters refer to like throughout the several views, and in which.

DETAILED DESCRIPTION OF A PREFERRED EMBODIMENT OF THE PRESENT INVENTION

Figure 1:
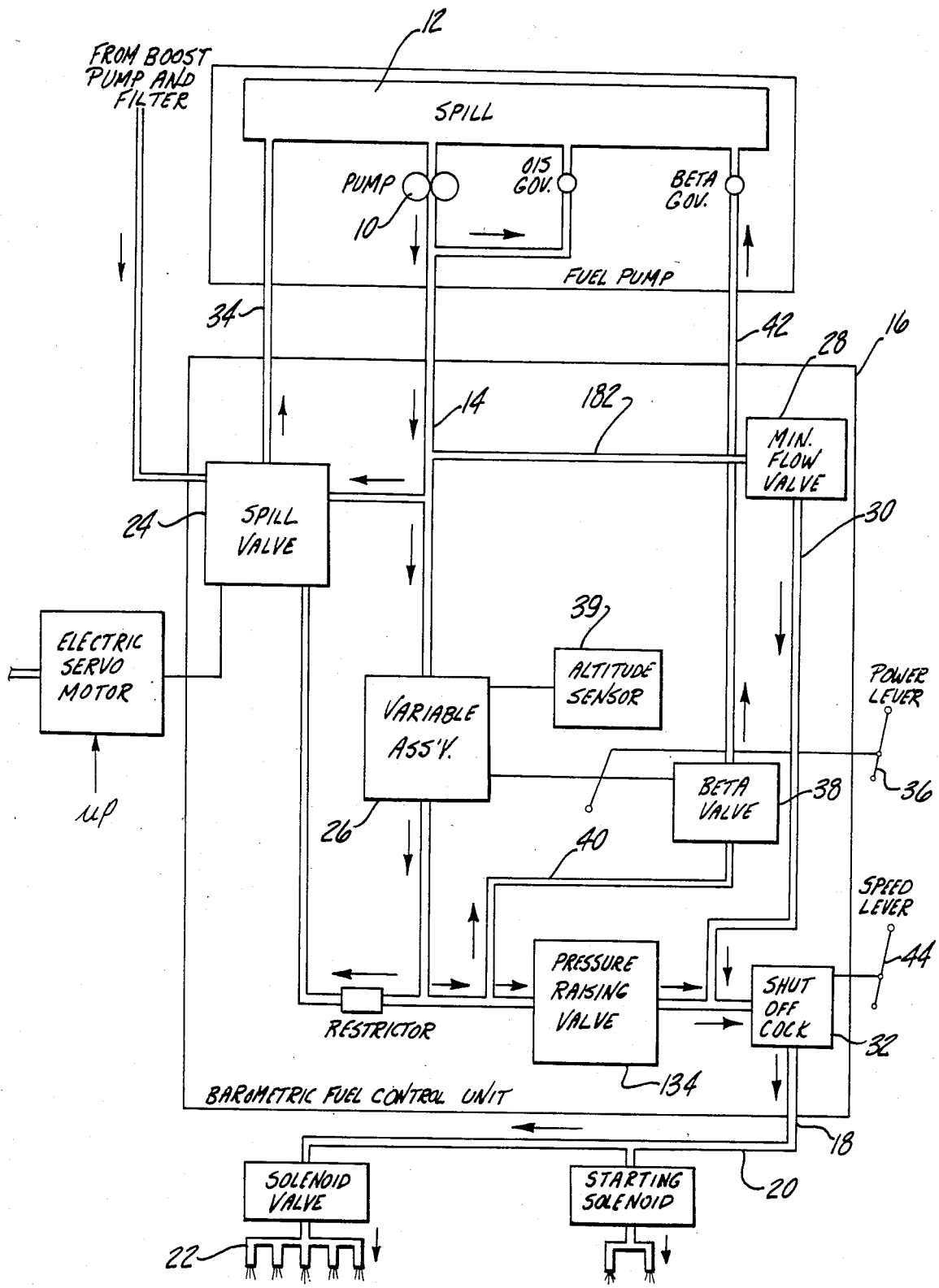
FIG. 1 is a diagrammatic view illustrating a preferred embodiment of the fuel control system of the present invention.

With reference first to FIG. 1, a diagrammatic view of a preferred embodiment of the present invention is thereshown and comprises a fuel pump 10 having its inlet connected to a source 12 of fuel. The outlet from the pump 10 in turn is connected to an inlet 14 of a fuel control assembly 16. The fuel control assembly 16 includes an outlet 18 which is connected by a conduit 20 to a fuel distributor or sprayer 22 of a turbine engine. The turbine engine (not shown) includes an air compressor having an intake and a discharge open to an engine combustion chamber.

Still referring to FIG. 1, the fuel control assembly inlet 14 is fluidly connected to a spill valve 24, a variable orifice assembly 26 and a minimum flow valve 28. The minimum flow valve 28 has an outlet fluidly connected through a passageway 30 to the fuel control assembly outlet 18 via a shutoff valve 32. Assuming that the shutoff valve 32 is open, the minimum flow valve 28 maintains a minimum fuel flow from the fuel source 12 and to the sprayers 22 to prevent engine flame out during deceleration.

A speed control lever 44 is used to selectively open or close the shutoff valve 32. When the shutoff valve 32 is closed, fuel flow to the sprayers 22 is terminated.

The spill valve 24, which will be subsequently described in greater detail, has an outlet fluidly connected by a spill conduit 34 to the fuel source 12. In operation, the spill valve 24 returns or diverts a portion of the fuel flow from the fuel pump 10 back to the fuel source 12 and thus functions as a pressure regulator by maintaining a constant pressure drop across the variable orifice 26. The spill valve 24 is microprocessor controlled and decreases the fuel flow to the fuel sprayers when the exhaust gas temperature exceeds a calculated amount.

Lastly, the variable orifice 26 is operable to vary the fuel flow rate from the fuel control inlet 14 and to the outlet 18. As will become subsequently apparent, the variable orifice 26 is responsive both to the position of an engine throttle 36 as well as an altitude sensor 39. The altitude sensor 39 determines the differential pressure between the intake of the engine compressor (not shown) and the engine compressor discharge pressure.

The fuel control assembly 16 further comprises a beta valve 38 having an inlet fluidly connected by a passageway 40 to the outlet from the variable orifice 26. The beta valve 38 includes an outlet which is connected by a spill conduit 42 to divert fuel flow from the variable orifice 26 and to the fuel source 12 in dependence upon the position of the throttle 36. The beta valve 38 is opened by the throttle 36 when the throttle is moved from the flight and to the ground position. In its open position, the beta valve 38 returns a substantial amount of the fuel flow from the variable orifice 26 back to the fuel source 12. Conversely, when the throttle 36 is moved to the flight position, the beta valve 38 is closed.

Figure 2:
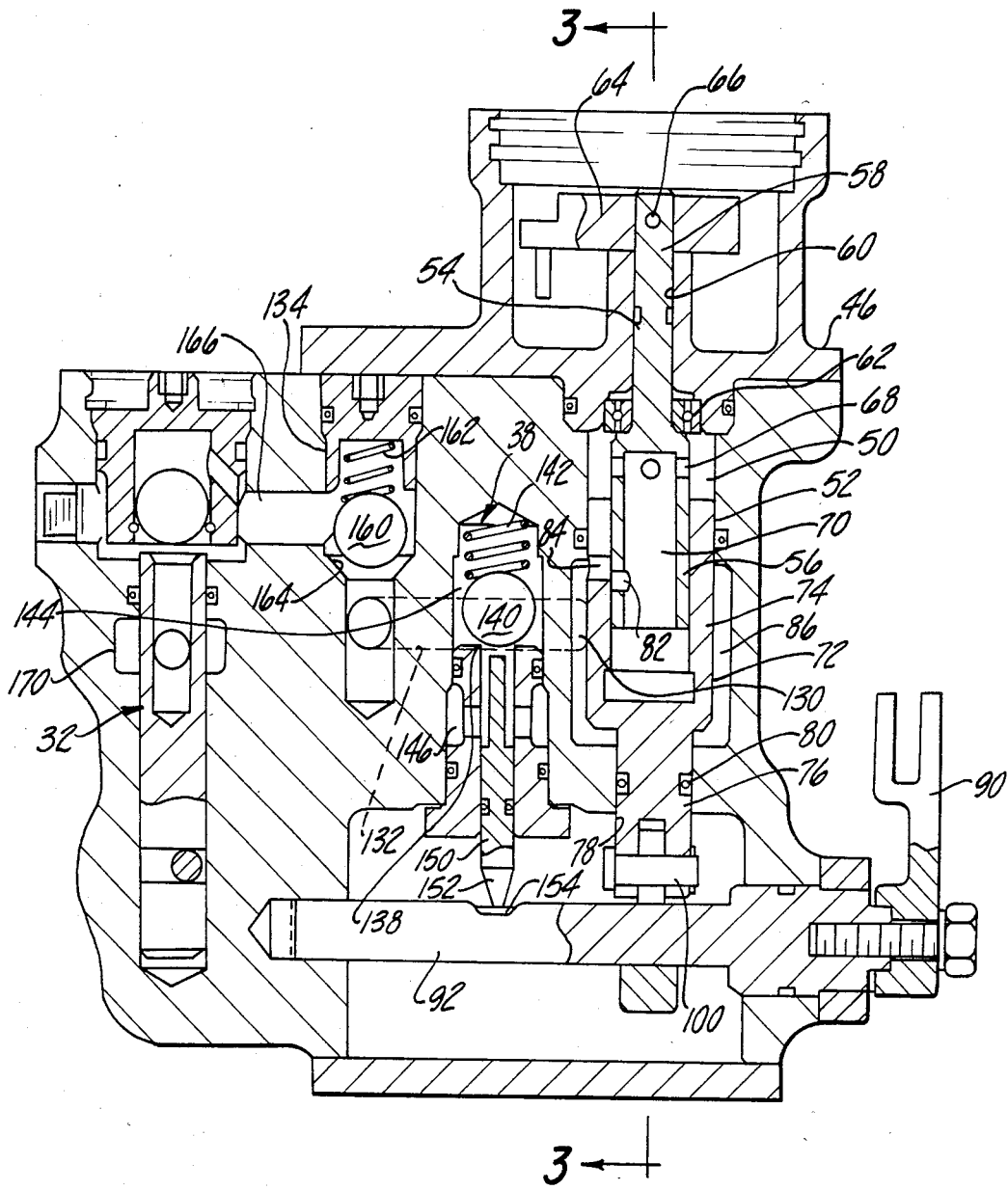
FIG. 2 is a cross sectional view of a preferred embodiment of the invention.
Figure 3:
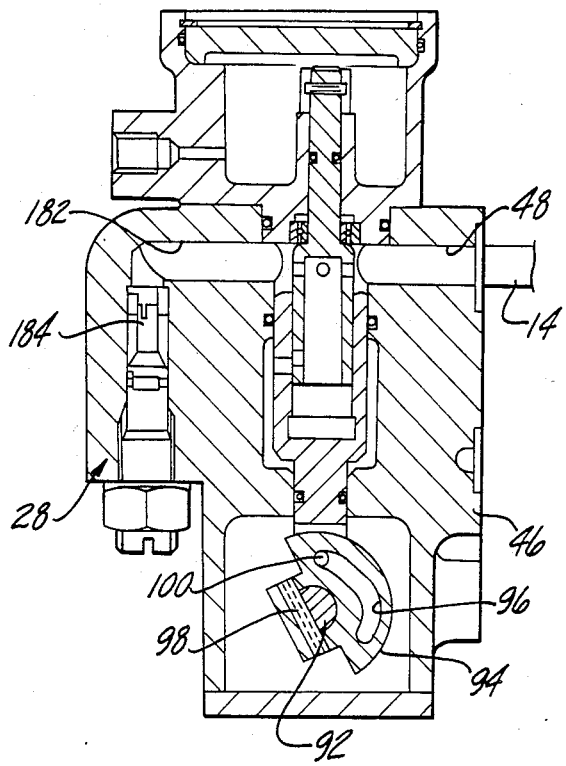
FIG. 3 is a sectional view taken substantially along line 2—2 in FIG. 2.

With reference now to FIGS. 2 and 3, the fuel control assembly 16 comprises a housing 46 having an inlet passageway 48 (FIG. 3) which is fluidly connected to the outlet of the pump 10 by the conduit 14. The inlet passageway 48 is open to the upper end of a generally cylindrical inlet fuel chamber 50 formed in the housing 46.

Still referring to FIGS. 2 and 3, a variable orifice assembly 52 is positioned within the fuel chamber 50. The variable orifice assembly 52 comprises a first orifice member 54 having a tubular and cylindrical portion 56 positioned within the fuel chamber 50 and an elongated cylindrical stem 58 is rotatably mounted within a housing bore 60 by a ball bearing assembly 62. A lever 64 is secured to the stem 58 by a pin 66 which constrains the first orifice member 54 against axial movement while still permitting the first orifice member 54 to rotate. The orifice member 54 also includes a plurality of radial openings 68 which establish fluid communication from the fuel chamber 50 and to the interior 70 of the orifice member tubular portion 56.

The variable orifice assembly 52 further comprises a second orifice member 72 having a tubular and cylindrical portion 74 and a cylindrical stem 76. The stem 76 is axially slidably mounted within a bore 78 in the housing 46 while fluid seals 80 prevent fluid leakage along the stem 76.

The inside diameter of the second tubular portion 74 is substantially the same as the outside diameter of the first member tubular portion 56 so that the tubular portion 56 is telescopically received within the second orifice member tubular portion 74.

Figure 6:
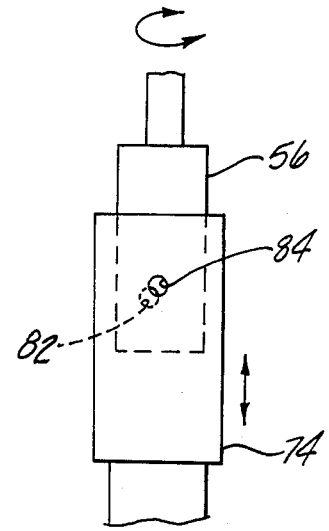
FIG. 6 is a diagrammatic view illustrating the operation of the preferred embodiment of the variable orifice assembly of the invention.

The first and second member tubular portions 56 and 74, respectively, each include an orifice 82 and 84, respectively, formed through them. The orifices 82 and 84, moreover, overlap each other and thus establish fluid communication from the interior 70 of the first orifice member tubular portion 56 and an annular fuel outlet chamber 86 formed in the housing 46. Moreover, as best shown in FIG. 6, the area of overlap of the orifices 82 and 84 is dependent upon both the rotational position of the first orifice member 54 and the axial position of the second orifice member 72.

The axial position of the second orifice member 72 is controlled by the position of the throttle 36 (FIG. 1). In the preferred form of the invention, the throttle 36 is connected to a lever 90 which is secured to an actuating rod 92. The actuating rod 92 is rotatably mounted within the housing 46 so that actuation of the throttle 36 rotatably moves the rod 92. As is best shown in FIG. 3 a cam 94 having a cam slot 96 is secured to the actuating rod 92 by a pin 98 so that the cam 94 and rod 92 rotate in unison with each other. A pin 100 is fixedly secured to the stem 76 of the second orifice member 72 and this pin 100 extends through the cam slot 96. Consequently, rotation of the rod 92 by actuation of the throttle 36 simultaneously axially displaces the second orifice member 72.

Figure 4:
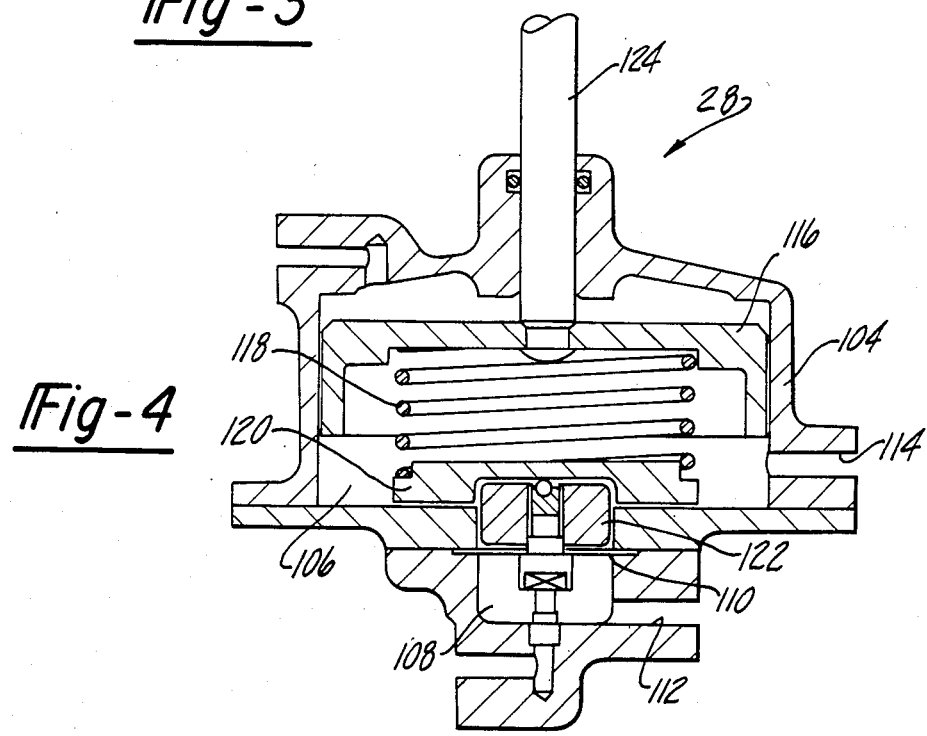
FIG. 4 is a sectional view of a preferred embodiment of the diaphragm assembly of the present invention.

With reference now particularly to FIG. 4, the altitude sensor 39 is thereshown and, in operation, controls the rotational position of the first orifice member 54. The altitude sensor comprises a housing 104 defining an upper chamber 106 and a lower chamber 108. The lower chamber 108 is smaller in volume than the upper chamber 106 and the chamber 106 and 108 are separated from each other by a diaphragm 110.

The lower chamber 108 is fluidly connected via a passageway 112 to the turbine engine compressor discharge pressure. Similarly, the upper chamber 106 is fluidly connected by a passageway 114 to the compressor intake pressure. Consequently, the deflection of the diaphragm 110 is dependent upon the differential between the compressor discharge pressure and intake pressure.

A servo piston 116 is longitudinally slidably mounted within the upper chamber 106 and is mechanically connected to the diaphram 110 through a compression spring 118, spring retainer 120 and a cylindrical member 122. One end of an actuating rod 124 is connected to the servo piston 116 so that axial displacement of the servo piston 116 axially displaces the rod 124. The other end of the rod 124 is connected to the lever 64 (FIG. 2) so that axial displacement of the rod 124 rotatably displaces the first orifice member 54. It will, of course, be understood that other pressure differential sensing means can be used in lieu of the altitude sensor 39 shown in FIG. 4 to control the rotary position of the first orifice member 54.

With reference again to FIGS. 1 and 2, an outlet 130 (FIG. 2) from the fuel outlet chamber 86 is fluidly connected by a passageway 132 to the inlet of a pressure raising valve 134 and the beta valve 38. The beta valve 38 and pressure raising valve 134 will each be separately described below.

The beta valve 38 comprises a valve seat 138 secured to the housing 46 and valve member 140. The valve member 140 is preferably spherical in shape and is urged against the valve seat 138 by a helical compression spring 142. When the beta valve 38 is in its closed position, i.e., when the valve member 140 abuts against the valve seat 138, fluid communication from a beta valve inlet chamber 144 is fluidly closed from its outlet 146. The beta valve outlet 146 is fluidly connected to the fuel line 40 (FIG. 1) so that the entire fluid flow from the fuel outlet chamber 130 flows to the pressure raising valve 134. Conversely, when the beta valve 38 is open, fuel flow from the fuel outlet chamber 130 is diverted through the beta valve outlet 146, conduits 40 and 42 (FIG. 1) and is returned to the fuel source 12.

A valve actuator 150 is axially slidably mounted within the beta valve 38. The valve actuator 150 includes a cam follower surface 152 which cooperates with a cam surface 154 on the rod 92. The beta valve actuator 150 is designed so that when the throttle 36 (FIG. 1) is moved to the ground position, the valve actuator 150 shifts axially upwardly as viewed in FIG. 2 and unseats the beta valve member 140. Conversely, when the throttle 36 is moved to the flight position, the beta valve actuator 150 shifts axially downwardly and allows the beta valve member 140 to abut against the beta valve seat 138 thus terminating fuel flow through the beta valve 38.

The pressure raising valve 134 is relatively simple in construction and comprises a spherical valve member 160 which is urged by a compression spring 162 toward a valve seat 164 formed in the housing 46. The spring rate of the spring 162 controls the fuel pressure in an outlet passageway 166 from the pressure raising valve 134.

Still referring to FIGS. 1 and 2, the outlet passageway 166 from the pressure raising valve 134 is fluidly connected through the shutoff cock 32 to an outlet passage 170 formed in the housing 146. The outlet passage 170 is fluidly connected to the conduit 20 (FIG. 1) and thus to the fuel sprayers 22. The shutoff cock 32 is conventional in construction and is controlled by the position of the speed lever 44.

With reference not particularly to FIGS. 1 and 3, the minimum flow valve assembly 28 has its inlet connected by a passageway 182 to the fuel inlet passageway 48. The outlet from the minimum flow valve assembly 28 is fluidly connected to the passageway 166 (FIG. 2) from the pressure raising valve 134 by the passageway 30 (FIG. 1). The minimum flow valve assembly 28 comprises an orifice member 184 and establishes a minimum fuel flow rate from the housing inlet 48 and to its outlet 170 regardless of the position of the beta valve 38 or the position of the orifice members 54 and 72. The minimum flow valve assembly 28 ensures fuel flow to the fuel sprayers 22 during large decelerations and thus prevents engine flame out.

Figure 5:
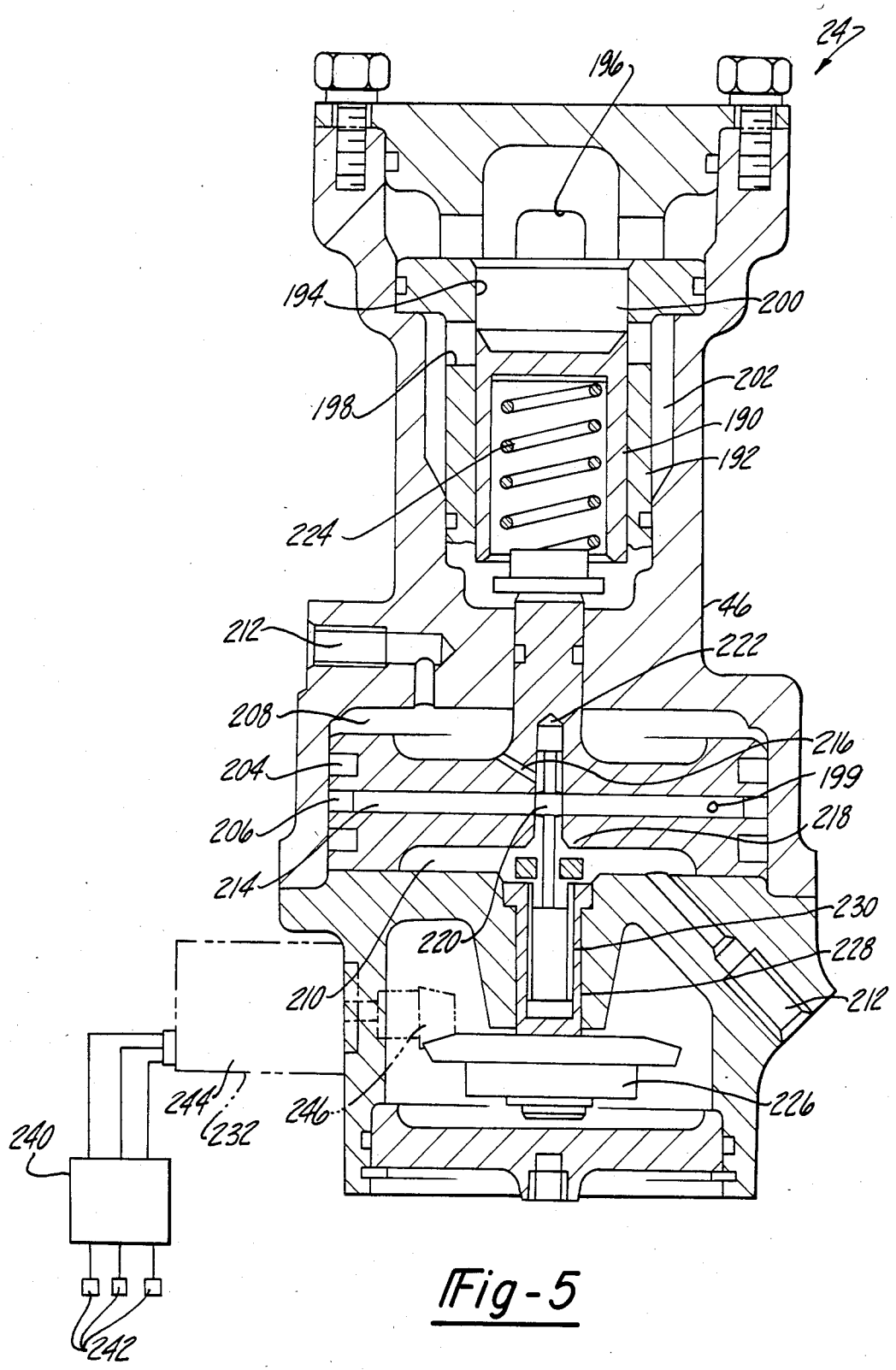
FIG. 5 is a sectional view of a preferred embodiment of the spill valve assembly.

With reference now to FIG. 5, the spill valve 24 is thereshown in greater detail and comprises a piston valve 190 which is axially slidably mounted within a valve sleeve 192. One end 194 of the valve sleeve 192 is fluidly connected 50 a passageway 196 which is open to the fuel inlet passageway 48. Consequently, the fuel pressure at the passageway 196 is the same as the outlet pressure from the fuel pump 10.

Still referring to FIG. 5, the piston valve 190 variably uncovers radial ports 198 formed in the valve sleeve 192 in dependence upon the axial position of the piston valve 190. The ports 198 fluidly connect a fuel inlet chamber 200 to a spill chamber 202 formed around valve sleeve 192. The spill chamber 202 is fluidly connected by the conduit 34 (FIG. 1) to the fuel source 12. Consequently, as the piston valve 190 shifts downwardly as viewed in FIG. 5, the area of opening of the radial ports 198, increases and a greater amount of fuel flows into the spill chamber 202 and is returned to the fuel source 12 thus reducing the fuel flow rate to the fuel sprayers 22. Conversely, as the piston valve 190 shifts upwardly as viewed in FIG. 5, the area of opening of the radial ports 198 decreases and the amount of fuel entering the spill chamber 202 likewise decreases thus simultaneously increasing fuel flow rate to the fuel sprayers 22.

The position of the piston valve 190 is controlled by a servo piston assembly 204 which is axially slidably mounted within a cylindrical chamber 206 formed in the housing 46. The servo piston 204 divides the chamber 206 into an upper chamber 208 and lower chamber 210. The chambers 208 and 210 are each connected to ambient pressure through a pair of leak orifice assemblies 212.

The servo piston 204 includes an interior chamber 214 which is fluidly connected by a part 199 to the pressure from the compressor discharge. The interior piston chamber 214 is in turn fluidly connected to the work chambers 208 and 210 through passageways 216 and 218, respectively. Furthermore, the leak orifice assemblies 212 are dimensioned so that the pressure in the work chambers 208 and 210 is maintained at substantially half the pressure in the interior piston chamber 214.

A spool valve 220 is axially slidably mounted within an axial bore 222 formed in the servo piston 204. The spool valve 220 selectively fluidly connects the interior piston chamber 214 with the passageways 216 and 218. For example, assuming that the spool valve 220 shifts upwardly from the position shown in FIG. 5, the pressure from the interior piston chamber 214 is diverted into the lower working chamber 210 which thus shifts the servo piston 204 upwardly until equilibrium is again reached. The axial displacement of the servo piston 204 is in turn transmitted to the slide piston 190 through a helical compression spring 224.

The axial position of the spool valve 220 is controlled by the rotational position of a bevel gear 226 which is rotatably mounted to the housing 46. The bevel gear 226 drives an internally threaded member 228 which threadably cooperates with an externally threaded portion 230 of the spool valve 220. Consequently, rotation of the bevel gear 226 axially displaces the spool valve 220 in one direction and vice versa.

A microprocessor controlled circuit 240 having input sensors 242 controls the actuation of a stepper motor 244 having an output gear 246 in mesh with the bevel gear 226. In the preferred form of the invention, the sensors 244 determine both the engine speed, engine intake temperature and the exhaust gas temperature of the turbine engine. The circuit 240 then calculates the maximum permissible exhaust gas temperature in dependence upon the engine speed and intake temperature and compares this calculated value with the exhaust gas temperature. If the exhaust gas temperature exceeds the maximum permissible amount, the circuit 240 actuates the stepper motor 244 to vary the position of the piston valve 190 to decrease the fluid flow to the fuel sprayers 22 until the exhaust gas temperature is less than the calculated maximum permissible amount.

With reference now to FIG. 1, the operation of the fuel control system will now be summarized in the interest of clarity. Assuming that the speed lever 44 is shifted to open the shutoff cock 32, activation of the fuel pump 10 pumps fuel from the source 12, through the fuel control unit 16 and out to the fuel sprayers 22. During the operation of the engine, the minimum flow valve 28 assures a minimum amount of fuel flow from the fuel pump 10 and to the fuel sprayers 22 regardless of the position of the throttle 36.

During normal operation of the engine, the throttle 36 controls the position of the second orifice member 72 of the variable orifice assembly 26 while the altitude sensor 39 controls the position of the first orifice member 54. The variable orifice assembly 26 thus varies the fuel flow rate through the fuel control unit 16 in dependence upon both the position of the throttle 36 and the altitude of the plane. In addition, assuming that the throttle 36 is in the flight mode, the beta valve 38 is closed so that fuel is not returned through the spill line 40 to the fuel source 12.

As has been previously described in greater detail, during the operation of the engine the spill valve assembly 24 varies the amount of fuel returned through the spill line 34 to the fuel source 12 after calculating the maximum permissible amount with the actual exhaust gas temperature. A greater fuel flow through the spill line 34 results in a lower fuel flow through the fuel control assembly 16 and vice versa.

A primary advantage of the present invention is that the variable orifice assembly 26, which forms the primary control of the fuel rate through the fuel control unit 16, is independently responsive to both the position of the throttle 36 as well as the altitude of the engine. As such, the fuel control system of the present invention is able to achieve maximum fuel economy and engine efficiency.

The variable orifice is designed to produce a turbine entry temperature versus the rotational speed of the engine such that at a fixed position of the engine throttle and at a given rotational speed of the engine, the turbine entry temperature is maintained substantially constant regardless of the altitude of the engine.

Having described my invention, however, many modifications thereto will become apparent to those skilled in the art to which it pertains without deviation from the spirit of the invention as defined by the scope of the appended claims.

We claim:

1. A fuel control system for a turbine engine for delivering fuel from a fuel source and to a combustion chamber, said turbine engine having a compressor with an intake and an outlet and a throttle, comprising:
   means for pumping fuel from the fuel source and to a fuel pump outlet,
   a fuel control assembly having a housing, an inlet and an outlet,
   means for fluidly connecting the fuel pump outlet to the fuel control assembly inlet,
   means for fluidly connecting the fuel control assembly outlet to the combustion chamber,
   wherein said fuel control assembly comprises,
   means for determining the difference between the compressor intake and discharge pressures and for generating a signal representative thereof,
   means for determining the position of the throttle and for generating a signal representative thereof, and
   a variable orifice means fluidly connected in series between said fuel control assembly inlet and outlet and independently responsive to both said pressure difference signal and said throttle position signal for controlling the fuel flow rate from said pump means and to combustion chamber
   wherein said variable orifice means comprises
   a first orifice member having an orifice, one side of said first orifice member being open to said fuel control assembly inlet,
   a second orifice member having an orifice, one side of said second orifice member being open to said fuel control assembly outlet,
   means for mounting said orifice members to said housing so that the other sides of said members abut against each other and so that said orifices overlap, and
   wherein said variable orifice means comprises means responsive to said pressure difference signal for moving one of said orifice members and means responsive to said throttle position for moving the other orifice member to thereby vary the area of overlap of said orifices
   wherein said first orifice member is movably mounted to said housing only along a first direction and wherein said second orifice member is only movably mounted to said housing along a second direction, said first and second directions being transverse with respect to each other.

2. The invention as defined in claim 1 wherein one orifice member is telescopically received within the other orifice member, and wherein said one orifice member is rotatably mounted to said housing while the other orifice member is axially slidably mounted to said housing.

3. The invention as defined in claim 1 and comprising means for maintaining a minimum fuel flow through said fuel control assembly regardless of the position of said throttle.

4. A fuel control system for a turbine engine for delivering fuel from a fuel source and to a combustion chamber, said turbine engine having a compressor with an intake and an outlet and a throttle, comprising:
   means for pumping fuel from the fuel source and to a fuel pump outlet,
   a fuel control assembly having a housing, an inlet and an outlet,
   means for fluidly connecting the fuel pump outlet, to the fuel control assembly inlet,
   means for fluidly connecting the fuel control assembly outlet to the cumbustion chamber,
   wherein said fuel control assembly comprises,
   means for determining the difference between the compressor intake and discharge pressures and for generating a signal representative thereof,
   means for determining the position of the throttle and for generating a signal representative thereof, and
   a variable orifice means fluidly connected in series between said fuel control assembly inlet and outlet and independently responsive to both said pressure difference signal and said throttle position signal for controlling the fuel flow rate from said pump means and to the cumbustion chamber
   means for determining the temperature of the exhaust gas from said engine, and
   means responsive to said temperature determining means for varying the fuel flow rate through said fuel control assembly
   wherein said last mentioned means comprises means for variably diverting a portion of the fuel flow into said fuel control assembly inlet back to said fuel source.

5. The invention as defined in claim 4 wherein said variable diverting means comprises:
   a valve sleeve having one end open to said housing inlet and at least one radial port formed through said valve sleeve, said radial port being open to a spill chamber formed in said housing,
   a fluid conduit for fluidly connecting said spill chamber to said fuel source,
   a piston valve axially slidably mounted in said valve sleeve so that the axial position of said piston valve varies the amount of opening of said radial port, and
   means for axially moving said piston valve.

6. The invention as defined in claim 5 wherein said means for moving said piston valve comprises:
   a servo piston,
   means for mechanically connecting said servo piston to said piston valve,
   means for sensing the exhaust gas temperature from the engine and for generating an exhaust gas temperature signal,
   means for determining the engine rotational speed, means for determining the compressor intake temperature,
means responsive to said intake temperature and speed sensing means for calculating a maximum permissible exhaust gas temperature,
means for comparing said maximum permissible exhaust gas temperature with said exhaust gas temperature signal, and
means responsive to said comparing means for moving said servo piston when the exhaust gas temperature signal exceeds the maximum permissible exhaust gas temperature.

7. The invention as defined in claim 6 wherein said servo piston is axially slidably mounted in a housing chamber, said servo piston dividing said housing chamber into an upper and a lower working chamber, and having an interior pressurized chamber, and wherein said servo piston moving means comprises:
a spool valve axially slidably mounted in said servo piston, said spool valve variably fluidly connecting said interior pressurized chamber with said working chambers, and
means responsive to said comparing means for axially moving said spool valve.

* * * * *